(12) United States Patent
Jiang et al.

(10) Patent No.: US 11,086,522 B1
(45) Date of Patent: Aug. 10, 2021

(54) OPTIMAL PORT SELECTION FOR DATA MIGRATION

(71) Applicant: EMC IP Holding Company LLC, Hopkinton, MA (US)

(72) Inventors: Xuedong Jiang, Westford, MA (US); John Copley, Hopkinton, MA (US); Michael Specht, Acton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 746 days.

(21) Appl. No.: 15/274,671

(22) Filed: Sep. 23, 2016

(51) Int. Cl.
*G06F 3/06* (2006.01)

(52) U.S. Cl.
CPC .............. *G06F 3/061* (2013.01); *G06F 3/067* (2013.01); *G06F 3/0635* (2013.01)

(58) Field of Classification Search
CPC ...... G06F 3/061; G06F 3/0635; G06F 3/0653; G06F 3/067
See application file for complete search history.

(56) References Cited

U.S. PATENT DOCUMENTS

| 6,658,540 | B1 * | 12/2003 | Sicola | G06F 11/2007 |
| | | | | 707/999.202 |
| 7,831,709 | B1 * | 11/2010 | Ham | H04L 41/0853 |
| | | | | 370/229 |
| 8,467,294 | B2 * | 6/2013 | Raman | H04L 47/125 |
| | | | | 370/235 |
| 8,621,101 | B1 * | 12/2013 | Starr | H04L 67/28 |
| | | | | 709/223 |
| 9,058,119 | B1 * | 6/2015 | Ray, III | G06F 3/061 |
| 2008/0301333 | A1 * | 12/2008 | Butler | G06F 3/0607 |
| | | | | 710/38 |

* cited by examiner

*Primary Examiner* — Sanjiv Shah
*Assistant Examiner* — Alexander J Yoon
(74) *Attorney, Agent, or Firm* — Anderson Gorecki LLP

(57) ABSTRACT

Automated port selection for data migration includes an algorithm that selects a set of SAN ports with the following properties: the selected ports have the least port utilization among all possible port selections; the number of independent data paths between the selected ports is no smaller than a user configurable minimum number; and the difference between the aggregate bandwidth of the ports on both arrays is minimized.

19 Claims, 3 Drawing Sheets

OPTIMAL PORT SELECTION FOR DATA MIGRATION

BACKGROUND

The subject matter of this disclosure is generally related to data storage systems that store large data sets for supporting multiple host applications and potentially many concurrent users. A data storage system may include multiple storage arrays. Each storage array includes interconnected computing nodes that manage access to tangible storage devices such as HDDs (hard disk drives) or high performance SSDs (solid State drives). The computing nodes may present logical storage devices to the host applications. The data that is ostensibly stored on the logical devices from the perspective of the host applications is actually stored on the tangible storage devices.

It is sometimes necessary to migrate data between storage arrays. For example, data may be migrated away from a storage array due to changing data access patterns, or in preparation for equipment replacement, maintenance or software upgrades. In order to migrate data between two storage arrays with as little disruption to the applications as practical it is common to provision multiple data paths between the storage arrays through an interconnecting network. Redundant data paths improve performance and reliability of the data migration process. Independent data paths, i.e. data paths that do not share any physical link or port with another provisioned data path, can help to avoid contemporaneous failure of multiple data paths. Provisioning of data paths can be accomplished through a combination of zoning and RDF (remote data facility) groups over a set of SAN (storage area network) ports on the storage arrays. The existing technique to provision the RDF groups requires users to manually find and choose a set of SAN ports on the storage arrays. This manual process is time consuming, inefficient and may also be error prone. For example, incompatible SAN ports may be found and inadvertently selected when creating the RDF groups. It may also be difficult for users to optimize the use of resources through manual provisioning of RDF groups in a multi-storage array environment with a large number of ports. Because oversubscribed ports or links can cause excessive latency and degrade the performance of a SAN network, improper manual selection of SAN ports for RDF groups may cause performance degradation of the entire SAN network and inefficient use of resources.

SUMMARY

All examples, aspects and features mentioned in this document can be combined in any technically possible way.

In accordance with an aspect an apparatus comprises: a first storage array connected to a second storage array via a network, the first storage array comprising a processor and computer-readable instructions on non-transitory memory to analyze performance data of SAN ports and computing nodes, to select a set of ports comprising a first subset of all ports of the first storage array and a second subset of all ports of the second storage array based on lowest port utilization, to provision data paths between a plurality of port pairs, each port pair comprising one of the ports of the first subset and one of the ports of the second subset, and to migrate data between the first storage array and the second storage array via the provisioned data paths. In some implementations the instructions probe all eligible ports on the first storage array and the second storage array to discover the port pairs. In some implementations the instructions select the set of ports based on provision of a minimum number of independent data paths. In some implementations the instructions collect and analyze performance data of SAN ports and computing nodes. In some implementations the instructions select the set of ports based on balance between aggregate bandwidth of ports of the first subset with ports of the second subset. In some implementations the instructions are responsive to inputted identities of a migration source and a migration target. In some implementations the instructions select a predetermined minimum number of ports in the first subset and the second subset. In some implementations the instructions select a predetermined maximum number of ports in the first subset and the second subset. In some implementations the instructions exclude from selection ports having utilization greater than a predetermined utilization threshold. In some implementations the instructions are responsive to input specifying ports to be excluded from selection to exclude the specified ports from selection.

In accordance with an aspect a method comprises: in a system comprising a first storage array connected to a second storage array via a network: analyzing performance of all ports and computing nodes that interconnect the first storage array with the second storage array; selecting a set of ports comprising a first subset of all ports of the first storage array and a second subset of all ports of the second storage array based on lowest port utilization; provisioning data paths between a plurality of port pairs, each port pair comprising one of the ports of the first subset and one of the ports of the second subset; and migrating data between the first storage array and the second storage array via the provisioned data paths. In some implementations the method comprises probing all eligible ports on the first storage array and the second storage array to discover the port pairs. In some implementations the method comprises selecting the set of ports based on provision of a minimum number of independent data paths. In some implementations the instructions collect and analyze the performance data of ports and computing nodes. In some implementations the method comprises selecting the set of ports based on balance between aggregate bandwidth of ports of the first subset with ports of the second subset. In some implementations the method comprises receiving inputted identities of a migration source and a migration target. In some implementations the method comprises selecting a predetermined minimum number of ports in the first subset and the second subset. In some implementations the method comprises selecting a predetermined maximum number of ports in the first subset and the second subset. In some implementations the method comprises excluding from selection ports having utilization greater than a predetermined utilization threshold. In some implementations the method comprises, responsive to input specifying ports to be excluded from selection, excluding the specified ports from selection.

In accordance with an aspect a non-transitory computer-readable storage medium comprises: program code responsive to input that identifies a first storage array as a migration source and a second storage array as a migration target to: probe all eligible ports on the first storage array and the second storage array to discover ports of the first storage array connected with ports of the second storage array; analyze performance of the discovered connected ports and associated computing nodes; select a set of ports from the discovered ports based on lowest port utilization, provision of a minimum number of independent data paths and balance between aggregate bandwidth of selected ports of the first storage array with selected ports of the second storage array; provision data paths between connected pairs of the selected ports; and migrate data between the first storage array and the second storage array via the provisioned data paths. In some implementations the program code selects a number of ports between a predetermined minimum number and a predetermined maximum number.

DETAILED DESCRIPTION

Some aspects, features and implementations described herein may include machines such as computer devices, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The terms "logic" and "algorithm" are used to refer to special purpose physical circuit elements and software instructions that are stored on a non-transitory computer-readable medium and implemented by multi-purpose tangible processors.

Figure 1:
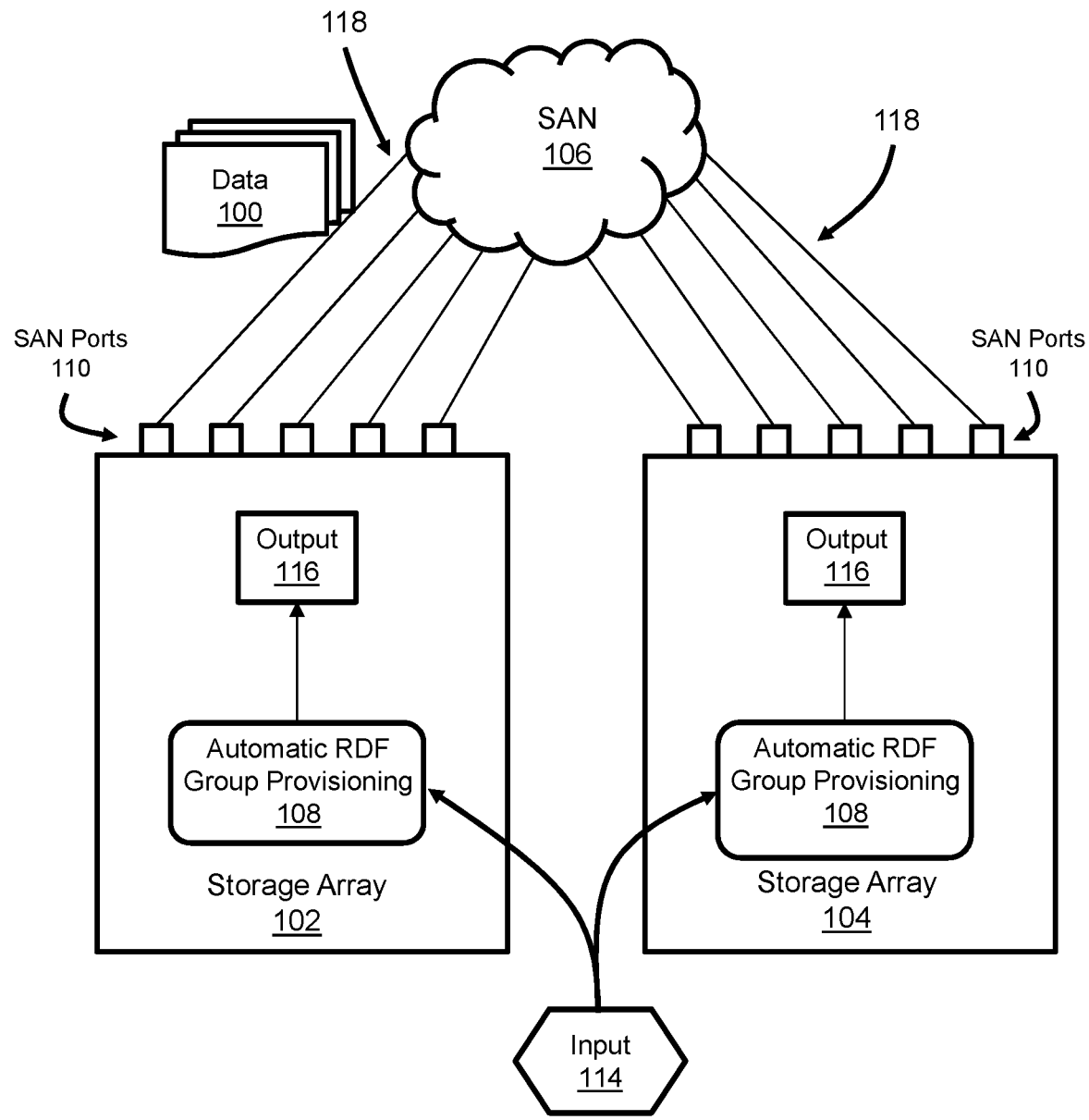
FIG. 1 illustrates data migration between storage arrays using automatic RDF group provisioning programs.

FIG. 1 illustrates migration of data 100 between storage array 102 and storage array 104 via SAN 106 using a set of SAN ports 110 selected by one or more automatic RDF group provisioning programs 108 running on one or more of the storage arrays, or on an external server attached to the storage arrays. The programs 108 automatically discover SAN connectivity between pairs of ports of the storage arrays 102, 104 and then select (from all ports) the set of SAN ports 110 based on satisfaction of predetermined conditions. In particular, the programs 108 select the SAN ports that have the lowest port utilization (e.g., the least busy ports in terms of IOPS) among all possible port selections. Further, the programs 108 collect and analyze the performance data of SAN ports and computing nodes. Further, the programs 108 select the SAN ports such that the number of independent data paths 118 between pairs of the selected ports in the set is no less than a user-configurable minimum number. Further, the programs 108 select the SAN ports such that the difference between the aggregate bandwidth of the SAN ports on the storage arrays 102, 104 is minimized. Selecting the ports with the least utilization helps to minimize the chance of excessive latency of traffic flowing through the SAN ports. Selecting at least a minimum number of independent data paths helps to ensure sufficient redundancy when provisioning RDF groups over the selected set of SAN ports. Minimizing differences in aggregate bandwidth between the SAN ports of the storage arrays helps to avoid inefficient use of higher speed SAN ports connected with lower speed SAN ports.

The programs 108 make the port selections in response to input 114, e.g. input from the user. Input 114 may include the identities of the source storage array 102 and the target storage array 104 for which the RDF group needs to be provisioned. Input 114 may also include a minimum number of SAN ports to be used for the RDF group and other optional configurations that will be described in greater detail below. Output 116 of the programs 108 may include, in the case of selection success, an RDF group built upon a set of SAN ports 110 selected according to the predetermined conditions. In the case of selection failure the program output 116 may include an indication of the number of ports found.

Figure 2:
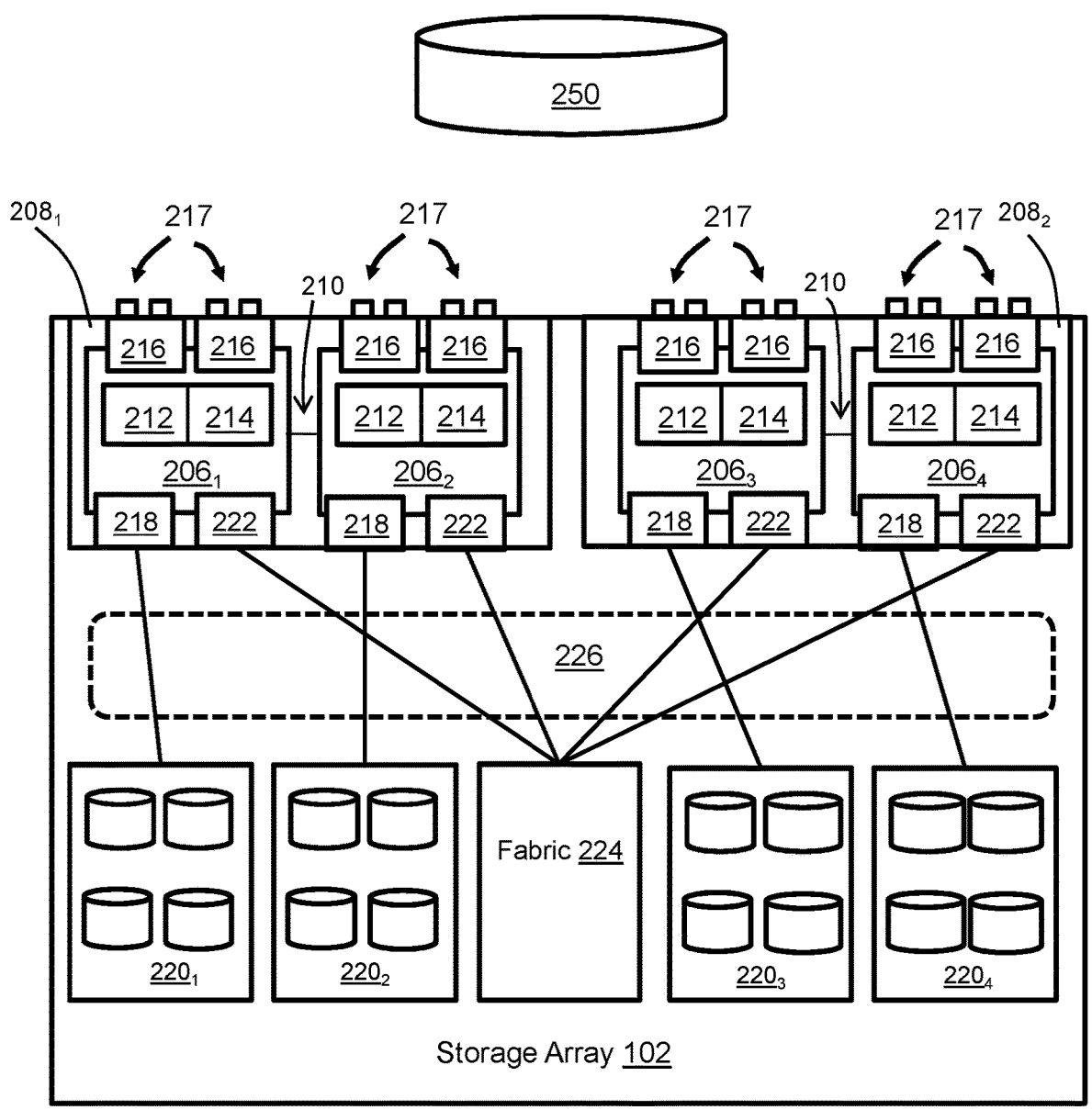
FIG. 2 illustrates a storage array of FIG. 1 in greater detail.

FIG. 2 illustrates an implementation of storage array 102 with the automatic RDF group provisioning program in greater detail. The storage array 102 includes a plurality of computing nodes $206_1$-$206_4$, of which there may be any number. Pairs of computing nodes ($206_1$, $206_2$) and ($206_3$, $206_4$) may be organized as storage engines $208_1$, $208_2$, respectively. The paired computing nodes of a storage engine may be directly interconnected by communication links 210. Each computing node includes at least one tangible multi-core processor 212 and a local memory (cache) 214. The local cache may include, for example and without limitation, volatile memory components such as RAM (random access memory) and non-volatile memory components such as high performance SSDs (solid state devices). Each computing node may include one or more FEs 216 (front-end directors, aka front end adapters), each of which may include multiple SAN ports 217 for communicating with other devices via the SAN. Each computing node may also include one or more BEs 218 (back end directors, aka back end adapters) for communicating with associated back end storage, i.e. managed drives $220_1$-$220_4$. Each set of managed drives may include tangible storage devices of one or more technology types, for example and without limitation SSDs such as PCM (phase change memory) and flash, and HDDs (hard disk drives) such as SATA (Serial Advanced Technology Attachment) and FC (Fibre Channel). Each computing node may also include one or more CAs (channel directors, aka channel adapters) 222 for communicating with other computing nodes via interconnecting fabric 224. Each computing node may allocate a portion or partition of its respective local cache 214 to a virtual shared cache 226 that can be accessed by other computing nodes, e.g. via DMA (direct memory access) or RDMA (remote direct memory access).

The computing nodes $206_1$-$206_4$ of the storage array 102 maintain at least one logical storage device 250, for which the associated data is stored in the managed drives $220_1$-$220_4$. Without limitation, the logical storage device 250 may be referred to as a device, production volume, production LUN or host LUN, where LUN (logical unit number) is a number used to identify the logical storage volume in accordance with the SCSI (small computer system interface) protocol. The logical storage device 250 represents an abstraction layer between the managed drives $220_1$-$220_4$ and an application running on a host computer (not illustrated). From the perspective of the host computer the logical storage device 250 is a single data storage device having a set of contiguous fixed-size LBAs (logical block addresses) on which data used by the host applications resides. However, the data used by the host applications may actually be maintained by the computing nodes at non-contiguous addresses on various different managed drives. The storage array maintains metadata indicative of the locations of extents of data on the managed drives. Consequently, the computing nodes can use the metadata to determine the actual location of data on the managed drives based on a reference to the logical storage device in an IO from the host computer. The migrated data 100 (FIG. 1) may include some or all of the data of the logical storage device 250. The automatic RDF group provisioning program 108 (FIG. 1) may run on one or more of the computing nodes, e.g. using the processor and memory thereof, or on an external server attached to the storage arrays.

Referring to FIGS. 1 and 2, an algorithm that may be implemented by the automatic RDF group provisioning programs 108 to select a set of SAN ports 110 from all SAN ports 217 (and all SAN ports of storage array 104) will be described. A two-stage optimization may be employed. The first stage optimization involves selecting an optimal set of SAN ports with the least utilization connected by a minimum number of independent data paths. The model for the first stage optimization is based on a bipartite graph G=(N, E), where N is the set of nodes formed by two disjoint subsets $N_s$ and $N_t$, and $n \in N_s$, $m \in N_t$ for all links $(n,m) \in E$. Each node represents a port. Each link indicates connectivity between ports. Note that a link can be a logical concept which is an abstraction of a physical path in a switched SAN network connecting two nodes. A cost function $C_n$ is defined for a node n. The objective is to select a set of nodes M with minimum cost C:

| Minimize | $C = \max_{n \in M} C_n$ |
| --- | --- |
| s.t. | $M = M_s \cup M_t$ |
| | $M_s \cap M_t = \emptyset$ |
| | $M_s \subseteq N_s$ |
| | $M_t \subseteq N_t$ |
| | $\Sigma_n \delta(n, m) = 1, \forall m \in M_t$ |
| | $\Sigma_m \delta(n,m) = 1, \forall n \in M_s$ |
| | $|M_t| = |M_s| = k$ | where $\delta(n,m) \in \{0,1\}$, $\forall n \in N_s$, $\forall m \in N_t$ is the connectivity function such that $\delta(n,m)$ is 1 if there is a link between nodes n and m, or 0 if there is no link between nodes n and m. k>0 is the minimum number of independent links between $N_s$ and $N_t$. The first two constraints imply that $M_s$ and $M_t$ are disjoint subsets of M, where $M_s$ is the set of ports selected on the first array and $M_t$ the set of ports selected on the second array. The third and fourth constraints simply mean $M_s$ and $M_t$ is a subset of $N_s$ and $N_t$ respectively. The last three constraints imply that there are k independent links between $M_s$ and $M_t$.

A matching $E_M \subseteq E$ is a subset of links such that each node in N appears in at most one link in $E_M$, where M is the set of nodes. Node n is a free node, if no link from $E_M$ is incident to n. A path P is a sequence of nodes and links, $n_1, n_2, \ldots, n_l$ where $(n_i, n_{i+1}) \in E$, $\forall$ $1 \leq i \leq l-1$. A path P is an alternating path regarding $E_M$, if for every pair of subsequent nodes in P, one of them is in $E_M$ and another one is not. A path P is an augmenting path, if P is an alternating path such that its start and end nodes are free. The simplest augmenting path is a link connecting two free nodes. Note that the cost of a link, $C_l$, is the maximum of the cost of the two end nodes. The cost of a path is $C_p = \max_{l \in p} C_l$. The minimum cost augmenting path is an augmenting path P with the minimum cost among all feasible augmenting paths between a pair of (free) nodes.

An algorithm for finding the set of ports with minimum cost in the first stage is as follows:
$E_M = \emptyset$
do
    Find the minimum cost augmenting path $P=p(G;E_M)$
    Break if $P=\emptyset$
    $E_M = E_M \oplus P$
while ($|E_M|<k$)
Return M if $|E_M|=k$
Otherwise return failure if $P=\emptyset$ In each repetition, the algorithm expands $E_M$ with the minimum cost augmenting path, so the eventual set of M is the set of nodes with the minimum cost among all feasible selections. Failure is returned if not enough augmenting path can be found. If the cost function is defined as the utilization of a port, the algorithm generates a set of least utilized ports satisfying the constraints.

The following algorithm finds the minimum cost augmenting path P:
Build a directed graph $(G;E_M)$ with unmatched links from $N_s$ to $N_t$, and matched links from $N_t$ to $N_s$;
Add dummy nodes s and t;
Add dummy links between s and free nodes in $N_s$;
Add dummy links between t and free nodes in $N_t$;
Assign zero cost to all the dummy links;
Use Dijkstra algorithm to find the minimum cost augmenting path $P=p(G;E_M)$ from s and t.

Note that the Dijkstra algorithm is slightly modified from the well-known version such that it calculates a path with the minimum cost between nodes s and t, instead of calculating a path with the shortest distance. Also note that the problem becomes a maximum cardinality matching problem in a bipartite graph when $k=\min(N_s,N_t)$.

The second stage optimization minimizes the difference between the aggregate bandwidth of the SAN ports on both storage arrays. The optimization model for the second stage is:

| Minimize | $\Sigma_{m \in M_t'} R_m - \Sigma_{m \in Ms'} R_n$ |
| --- | --- |
| s.t. | $M_s \subseteq M_s' \subseteq N_s$ |
| | $M_t \subseteq M_t' \subseteq N_t$ |
| | $M' = M_t' \cup M_s'$ |
| | $M_t' \cap M_s' = \emptyset$ |
| | $|M_s'| \geq |M_t'| = k$ | where M' is a superset of M, and $R_n$ is the bandwidth of node n. $M_t'$ and $M_s'$ are disjoint subsets of M', where $M_s'$ is the set of ports selected on the first array and $M_t'$ the set of ports selected on the second array. Data migration usually happens between an old array and a new array where the port speed on the older array can be lower than that of the new array. The second stage optimization adds more ports on the source (first) array to balance the aggregate bandwidth of the ports selected on both arrays.

An algorithm for balancing the aggregate bandwidth of ports is as follows:
M'=M
for $(n,m) \in E_M$, $n \in M_s$, $m \in M_t$
    continue if $R_n = R_m$
    if $R_n < R_m$, find a node $\hat{n} \in N \setminus M_s$ s.t. $(\hat{n}, m) \in E$, $R_{\hat{n}} < R_m$
    break if $\hat{n}$ cannot be found break if $\Sigma_{n\in M_s}R_n+R_{\hat{n}}\geq\Sigma_{m\in M_t}R_m$
add $M'=\{\hat{n}\}\cup M'$ and continue;
end Implementations of the algorithms may be adjusted to accommodate one or more factors including but not limited to usability, tradeoffs between accuracy and simplicity of implementation, optimization towards the most common use cases, and handling of erroneous conditions.

Figure 3:
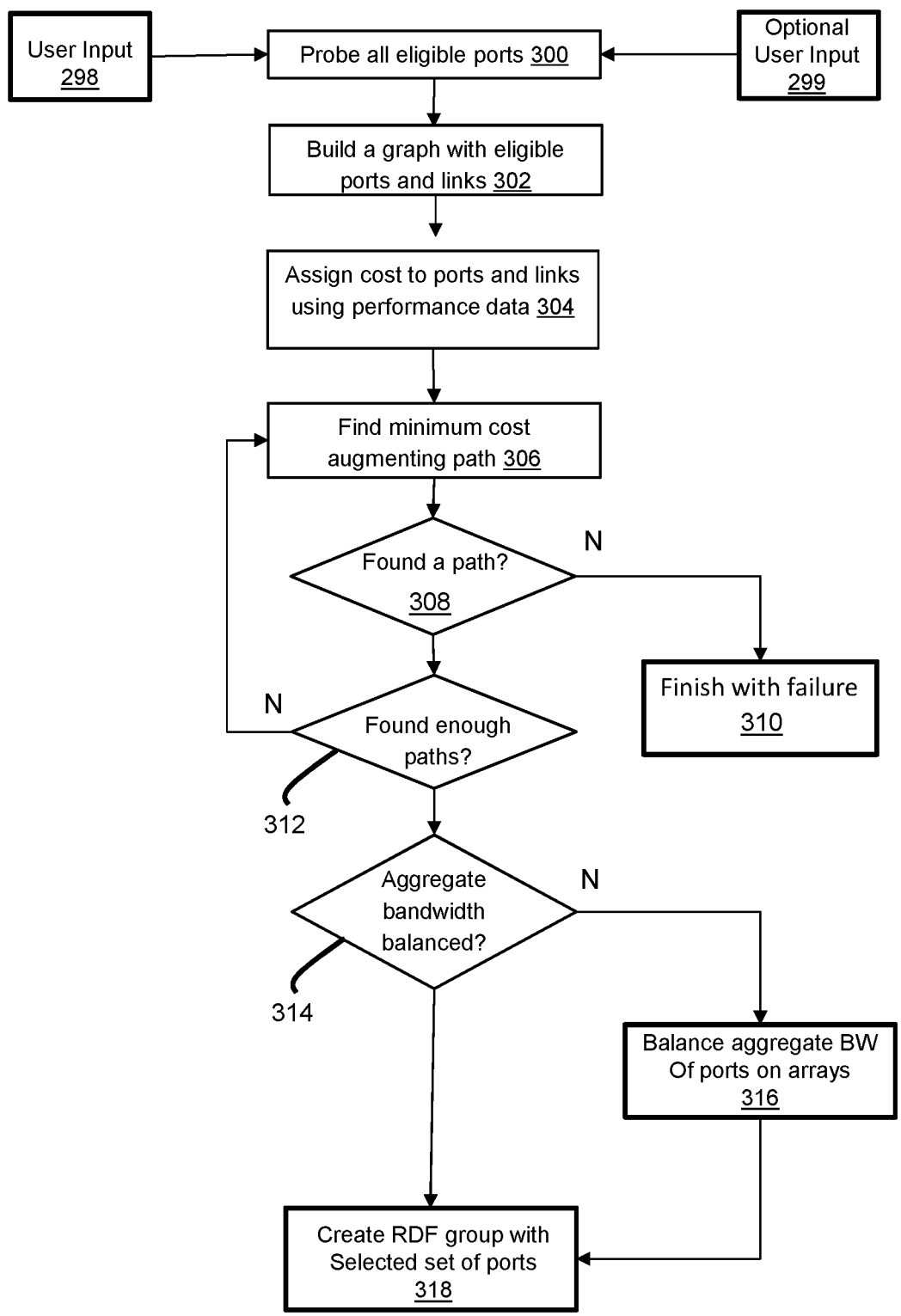
FIG. 3 illustrates a technique for automatic port selection for data migration using automatic RDF group provisioning programs.

FIG. 3 illustrates a technique for automatic port selection for data migration based on the algorithms described above. At block 298 a user inputs a source storage array identifier and a target storage array identifier. The source storage array identifier may include, for example and without limitation, a string that identifies storage array 102 (FIG. 1) as the data migration source. The target storage array identifier may include, for example and without limitation, a string identifying storage array 104 (FIG. 1) as the data migration target. At block 299 the user may enter any number of optional inputs. For example, the user may specify a minimum number of independent data paths. The specified value may replace a pre-configured default value such as 2 independent data paths, for example and without limitation. The optional input may include specifying a maximum number of ports to be selected. The entered value may replace a pre-configured default value such as 8, for example and without limitation. The optional input may include specifying a utilization threshold to prevent selection of ports having a utilization level that is greater than the specified threshold. The entered value may replace a pre-configured default value such as 0.5, for example and without limitation. The optional input may include specifying a set of ports to be excluded from selection. A default exclusion port set may or may not exist.

In order to probe all eligible ports as indicated in block 300, a storage array is selected that is appropriate to probe the SAN network, e.g. to discover the connectivity between port pairs including a SAN port on storage array 102 (FIG. 1) and a SAN port on storage array 104 (FIG. 1). As indicated in block 302, a graph is built using the result of block 300, where each SAN port is a node in the graph and two nodes are connected if they are connected from the results of block 300. As indicated in block 304, a cost is assigned to each port and link, e.g. using the performance data collected and processed by management software. The network may be pruned by removing links where the utilization of at least one port exceeds the utilization threshold, and by removing links connected to ports in the user exclusion set. Dummy source and sink nodes may be added to the network, and dummy links may be added between the source (sink) node and the one (the other) set of the bipartite graph respectively. Zero utilization is assigned to the dummy links.

As indicated in block 306, the automatic RDF group provisioning programs find the minimum cost augmenting path from the source to the target. If no such path is found and if the number of SAN port pairs is less than the minimum number of independent paths as determined at block 308 then the programs finish with failure as indicated in block 310. If such a path is found then the set of selected SAN ports is expanded by including the pair of SAN ports. If the number of SAN port pairs is less than the minimum number of independent paths as determined in block 312 then flow returns to block 306.

If the number of SAN port pairs is large enough to satisfy the minimum number of independent paths as determined in block 312 then the set of SAN ports is selected. With the set of selected ports, the aggregate bandwidth of the selected ports on both storage arrays is compared as indicated in block 314. If the aggregate bandwidth of the source is not balanced with the target then the algorithm loops through all ports unselected on the source storage array to balance or the aggregate bandwidth as indicated in block 316, where balance may mean minimizing the difference based on available ports. If a port on the source array is connected to a higher speed port on the target array then a port on the source array may be added to balance the aggregate bandwidth of the selected ports on both storage arrays. If the aggregate bandwidth is balanced as determined in block 314, or is balanced as indicated in block 316, an RDF group with the selected set of ports is created as indicated in block 318.

There are other options to define the cost function. One option is to define it as a running average of the port utilization which provides an estimate of the peak utilization level of the port recently. The cost can also take into consideration of longer term average queue length of ports.

Both Fibre Channel and Gigabit Ethernet ports can be used in the provisioning of RDF groups, but they cannot be mixed in the same RDF group. The algorithm is implemented such that users can give preference over the type of SAN ports selected. The algorithm finds less preferred type of ports if cannot select enough ports with the preferred type.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a first storage array connected to a second storage array via a network, the first storage array comprising a processor and computer-readable instructions on non-transitory memory to analyze performance data of SAN ports and computing nodes, to select a set of ports comprising a predetermined minimum number of ports in a first subset of all ports of the first storage array and a second subset of all ports of the second storage array based on lowest port utilization and data path independence, to provision data paths between a plurality of port pairs, each port pair comprising one of the ports of the first subset and one of the ports of the second subset, and to migrate data between the first storage array and the second storage array via the provisioned data paths.

2. The apparatus of claim 1 wherein the instructions probe all eligible ports on the first storage array and the second storage array to discover the port pairs.

3. The apparatus of claim 1 wherein the instructions select the set of ports based on provision of a minimum number of independent data paths.

4. The apparatus of claim 1 wherein the instructions select the set of ports based on balance between aggregate bandwidth of ports of the first subset with ports of the second subset.

5. The apparatus of claim 1 wherein the instructions are responsive to inputted identities of a migration source and a migration target.

6. The apparatus of claim 1 wherein the instructions select a predetermined maximum number of ports in the first subset and the second subset.

7. The apparatus of claim 1 wherein the instructions exclude from selection ports having utilization greater than a predetermined utilization threshold.

8. The apparatus of claim 1 wherein the instructions are responsive to input specifying ports to be excluded from selection to exclude the specified ports from selection.

9. A method comprising:
in a system comprising a first storage array connected to a second storage array via a network:
analyzing performance of all ports and computing nodes that interconnect the first storage array with the second storage array;
selecting a set of ports comprising a predetermined minimum number of ports in a first subset of all ports of the first storage array and a second subset of all ports of the second storage array based on lowest port utilization and data path independence;
provisioning data paths between a plurality of port pairs, each port pair comprising one of the ports of the first subset and one of the ports of the second subset; and
migrating data between the first storage array and the second storage array via the provisioned data paths.

10. The method of claim 9 further comprising probing all eligible ports on the first storage array and the second storage array to discover the port pairs.

11. The method of claim 9 further comprising selecting the set of ports based on provision of a minimum number of independent data paths.

12. The method of claim 9 further comprising selecting the set of ports based on balance between aggregate bandwidth of ports of the first subset with ports of the second sub set.

13. The method of claim 9 further comprising receiving inputted identities of a migration source and a migration target.

14. The method of claim 9 further comprising selecting a predetermined minimum number of ports in the first subset and the second subset.

15. The method of claim 9 further comprising selecting a predetermined maximum number of ports in the first subset and the second subset.

16. The method of claim 9 further comprising excluding from selection ports having utilization greater than a predetermined utilization threshold.

17. The method of claim 9 further comprising, responsive to input specifying ports to be excluded from selection, excluding the specified ports from selection.

18. A non-transitory computer-readable storage medium comprising:
program code responsive to input that identifies a first storage array as a migration source and a second storage array as a migration target to:
probe all eligible ports on the first storage array and the second storage array to discover ports of the first storage array connected with ports of the second storage array;
analyze performance of the discovered connected ports and associated computing nodes;
select a predetermined minimum number of ports in a set of ports from the discovered ports based on lowest port utilization and data path independence, provision of a minimum number of independent data paths and balance between aggregate bandwidth of selected ports of the first storage array with selected ports of the second storage array;
provision data paths between connected pairs of the selected ports; and
migrate data between the first storage array and the second storage array via the provisioned data paths.

19. The non-transitory computer-readable storage medium of claim 18 wherein the program code selects a number of ports between a predetermined minimum number and a predetermined maximum number.

* * * * *